Aug. 27, 1935.    G. W. BAUGHMAN    2,012,737
BRAKE CONTROLLING DEVICE
Filed May 12, 1934
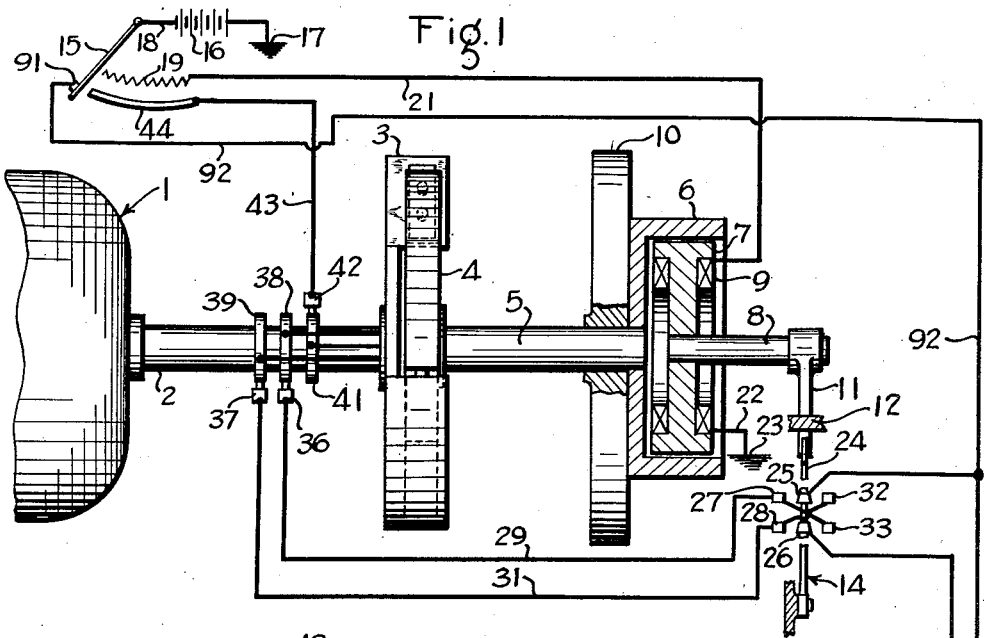
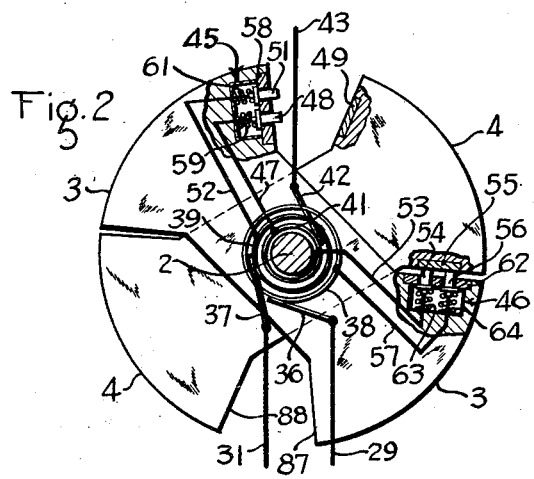
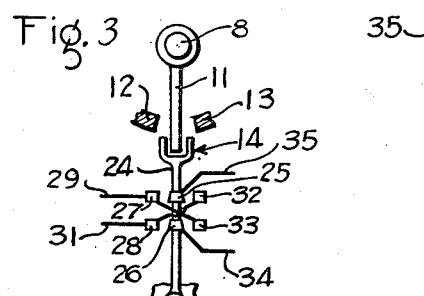
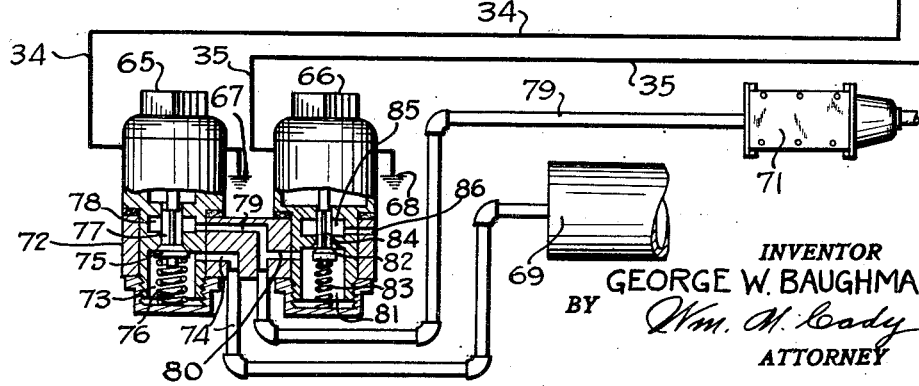
INVENTOR
GEORGE W. BAUGHMAN.
BY Wm. W. Cody
ATTORNEY Patented Aug. 27, 1935

2,012,737

UNITED STATES PATENT OFFICE 2,012,737

BRAKE CONTROLLING DEVICE

George W. Baughman, Edgewood, Pa., assignor to The Westinghouse Air Brake Company, Wilmerding, Pa., a corporation of Pennsylvania Application May 12, 1934, Serial No. 725,310

19 Claims. (Cl. 303—21)

This invention relates to vehicle brakes and particularly to apparatus for automatically controlling the degree of application of the brakes at predetermined values selected by the operator.

In vehicles employing friction type brakes, it is well known that for a given braking pressure such brakes are less effective in retarding the motion of a vehicle at high speeds than at low speeds because of the varying coefficient of friction between the wheels and the brake shoes which is lower at high speeds than at low speeds.

In order to bring a vehicle to a stop quickly, employing the maximum permissible brake pressure at all speeds, it has been the usual practice for an operator to apply the brakes with a high degree of braking pressure at high speed, and, as the speed of the vehicle lessens, to decrease the braking pressure gradually in order to provide for a smooth stop without shock or slipping of the wheels.

In accordance with my invention a flywheel is provided and is revolved at a speed that is substantially proportional to the speed of the vehicle. When it is desired to apply the brakes a substantially constant braking force is applied to the flywheel which initiates and controls the vehicle brakes in accordance with whether the flywheel is imparting energy to the vehicle or is receiving energy from the vehicle.

It is an object of my invention to provide for controlling the brakes of a vehicle to effect smooth operation thereof throughout the entire braking operation without the necessity of the train operator manually operating the brake control mechanism to effect this result.

Another object of my invention is to provide for automatically effecting a uniform retardation of the vehicle throughout all speeds at any selected rate determined by the position of the brake control means.

A further object of my invention is to provide for controlling the brakes to produce a substantially constant rate of retardation of the vehicle regardless of the speed characteristics of the brake.

A still further object is to provide for automatically releasing the brakes in the event that the braking force becomes sufficient to cause the wheels to slide on the rails and to immediately reapply the brakes when the speed of the wheels has again increased.

Other objects of the invention will be apparent during the course of the following description.

In the accompanying drawing forming a part of this specification and in which like numerals are employed to designate like parts in the several figures, Fig. 1 is a diagrammatic view of circuits and apparatus comprising one embodiment of my invention, Fig. 2 is an elevational view of the coupling member, and Fig. 3 is an end view of the pilot-controlled shaft and switch.

Referring to Fig. 1, a driving motor 1 is provided for driving the vehicle, and upon the extension of the motor shaft 2, one section 3 of a coupling device is secured that is adapted to engage with a section 4 of the coupling device that is secured to a shaft 5 upon which is mounted a flywheel 10. Any other suitable means that is responsive to the direction of the torque between the motor 1 and the flywheel 10 may be employed in place of the coupling sections 3 and 4 for driving the flywheel in accordance with the speed of the vehicle. A brake rim 6 attached to the flywheel 10 is formed of magnetic material, as is also the core or body portion of a stator structure 7 mounted within the rim of the flywheel on the shaft 8 and provided with an energizing winding 9. An arm 11 mounted on the shaft 8 limits the rotative movement of the stator structure 7 upon engagement with one of the stops 12 or 13. The arm 11 also operates a switch 14 in accordance with the direction of operation of the flywheel to select the proper control circuit in a manner to be later described. The magnetic core parts 6 and 7, together with the energizing winding 9 constitute an eddy current brake for decreasing the inertia of the flywheel 10, the details of which may be of any suitable construction such as that shown in application of John W. Logan, Jr., relating to Vehicle braking system, Serial No. 696,993, filed November 7, 1933, and assigned to the same assignee as this invention.

Energization of the winding 9 of the eddy current brake is effected by operation of the master controller 15 to close a circuit from the battery 16, on terminal of which is grounded at 17, through conductor 18, master controller 15, resistor 19, conductor 21, winding 9, conductor 22, to ground at 23 and back to the battery 16. Upon energization of the eddy current brake the stator structure 7 is dragged magnetically by the member 6 until the lever 11 engages one or the other of the stops 12 or 13, thus operating the switch 14 into one of its two operative positions. The switch 14, as best shown in Fig. 3, comprises a lever 24 pivotally supported at its lower end and bifurcated at its upper end to engage the lower end of the lever 11. The lever 24 carries two movable contact members 25 and 26 for engaging contact members 27 and 28, respectively, in one of its two operative positions, and members 32 and 33, respectively, in the other of its two operative positions, to connect conductors 29 and 31, respectively, with conductors 34 and 35, or with conductors 35 and 34 depending upon the direction of operation of the vehicle. The conductors 29 and 31 are connected, respectively, to brushes 36 and 37 that respectively engage slip rings 38 and 39, that are carried by, and form continuous conducting members about the shaft 2. A third slip ring 41 is mounted on the shaft 2 and engages a brush 42, that is connected by conductor 43 to a contact member 44 on the master switch.

The coupling member 3, driven by the shaft 2, carries two switch mechanisms 45 and 46 that are adapted to be closed by the coupling member 4 to connect the slip ring 41 to the one or the other of the slip rings 39 or 38 in dependence upon which coupling member tends to drive the other. The switch 45 closes a circuit from the slip ring 41, through conductor 47, contact member 48, bridging contact member 49 carried by the coupling segment 4, contact member 51 and conductor 52 to the slip ring 39. The switch 46 is adapted to close a circuit from the slip ring 41, through conductor 53, contact member 54, bridging contact member 55, contact member 56 and conductor 57 to the slip ring 38. The contact members 48 and 51 of the switch 45 extend through openings in a facing member 58 of insulating material and are pressed outwardly by spring members 59 and 61, respectively, to engage the bridging contact member 49. The contact members 54 and 56 of the switch mechanism 46 are supported in openings in the facing plate 62 of insulating material, to readily engage the bridging contact member 55 carried by the segment 4 and are pressed outwardly by the springs 63 and 64, respectively.

The mechanism above described controls the operation of an application valve mechanism 65 and a release valve mechanism 66 for controlling the flow of air under pressure from the reservoir 69 to a brake cylinder 71, and from the brake cylinder to the atmosphere. The application valve mechanism 65 comprises a casing 72 having, in its lower portion, a valve chamber 73 connected by an inlet port and pipe 74 to the reservoir 69. A valve 75 is provided and is pressed by a spring 76 upwardly to close a port 77 leading to an outlet chamber 78 and through an outlet port and pipe 79 to the brake cylinder 71. The release valve mechanism 66 is similar in construction to the application valve mechanism 65 and is provided with an inlet port 80 leading from the port 79 into a valve chamber 81 that is provided with a valve 82 in its upper portion, that is biased toward its seated position by the pressure of a spring 83 to close the port 84 leading to the outlet chamber 85, that is connected by a port 86 to the atmosphere.

In release position of the master controller 15 a circuit is completed from the battery 16 through back contact 91, conductors 92 and 35, and the winding of the release valve mechanism 66 to maintain the release valve in its open position and prevent pressure from building up in the brake cylinder.

If the motor 1 is driving the vehicle in a direction such that the coupling members 3 and 4 are revolving in a clockwise direction, as viewed in Fig. 2, the face 87 of the member 3 will be in engagement with the face 88 of the coupling member 4 and the face of member 3 supporting the switch 45 will be in engagement with the face of the coupling member 4 carrying the bridging member 49. Thus energy is being transmitted from the coupling member 3 through the coupling member 4 to drive the shaft 5 and the flywheel 10. The flywheel 10 will, therefore, be revolving in accordance with the speed of the vehicle. If the motorman wishes to apply the brake the controller 15 is moved toward the right, thus interrupting the circuit through the back contact 91 to deenergize the winding of the release valve mechanism 66 and effect movement of the release valve 82 to its seated position, and, at the same time, connecting the windings 9 of the eddy current brake with the battery 16 through the above traced circuit, the degree of energization of the brake depending upon the position of the contact member 15 on the resistor 19. The magnetic drag thus established between the revolving magnetic member 6 and the stator 7 causes the shaft 8 and the lever 11 to operate in a clockwise direction, or toward the left as viewed in Fig. 3, to close the switch 14 by bringing contact members 25 and 26 into engagement with the contact members 27 and 28, respectively. This application of the eddy current brake tends to decrease the speed of the flywheel 10, the brake and flywheel together acting as a pilot regulator for controlling the fluid pressure brake. The flywheel 10, accordingly, tends to run slower than the shaft 2, which is operated in accordance with the speed of the vehicle, and tends to supply energy to the vehicle through the coupling members 4 and 3. The amount of this energy is insignificant as compared to the inertia of the vehicle, but is sufficient to operate the switch 45 and maintain it in its circuit closing position. A circuit is thus closed from the battery 16 through conductor 18, contact members 15 and 44 of the master switch, conductor 43, brush 42 to the slip ring 41, through switch 45 to the slip ring 39, by conductor 31, contact members 28 and 26 of the switch 14, conductor 34 to the coil of the application valve 65 and to ground at 67, thus operating the application valve to open its port 77 and admit air from the reservoir 69 through pipes 74 and 79 to the brake cylinder 71 to apply the brake.

Air will continue to flow under pressure to the brake cylinder 71 until a maximum pressure is reached, or until the shaft 2 is rotated at a lesser speed than the shaft 5, connected to the flywheel 10, in which case the coupling member 4 will move out of engagement with the coupling member 3, permitting the switch 45 to open the circuit energizing the winding of the application valve 65, which valve will close and maintain the brake at the existing degree of brake pressure. Should the retardation effect of the eddy current brake upon the flywheel 10 correspond exactly to the retardation effect of the fluid pressure brake upon the wheels of the vehicle, the coupling section 4 will remain out of contact with the coupling section 3 maintaining the brake pressure as already applied. If, however, the pressure brake tends to slow down the vehicle at a greater rate of deceleration than the flywheel 10 is being slowed down the shaft 2 will revolve slightly slower than the shaft 5, bringing the coupling members into engagement to close the switch 46 as illustrated in Fig. 2. A circuit is now completed from the slip ring 41, through switch 46 to the slip ring 38, and by the brush 36, conductor 29, contact members 27 and 25 of the switch 14, conductor 35, the operating winding of the release valve 66 to ground at 68, thus operating the valve 62 downwardly and permitting the release of fluid under pressure from the brake cylinder 71. The resulting release of the brake 71 will cause the shaft 2 to decrease at a slower rate than the flywheel 10 and shaft 5, thus moving the coupling member 3 out of engagement with the coupling member 4 and opening the switch 46 to deenergize the winding of the release valve 66, thus effecting a closing of the valve by the pressure of the spring 83.

It will be apparent that the eddy current brake acting upon the flywheel serves as a pilot regulator to control the amount of braking pressure applied to the vehicle through the brake cylinder 71. Tests have shown that the eddy current brake has a practically uniform braking torque characteristic with respect to speed down to a very low value of speed, at which value the torque tends to decrease. The pilot controlled fluid pressure brake will, therefore, control the pressure applied to the wheels of the vehicle to give the same uniform braking force with respect to speed, releasing the brakes near the end of the stop thus giving a smooth stop. This invention will, therefore, overcome the characteristic operation of the fluid pressure friction brake which at low speed increases the braking action due to the increasing coefficient of friction at such speed and will smooth out the braking effect.

It will be noted that if the vehicle wheels tend to slide on the rail the speed of the shaft 2 will decrease more rapidly than that of the shaft 5 and flywheel 10, so that the supply of air to the brake cylinder is immediately cut off and air is vented from the brake cylinder. This action is started very promptly since a relatively small angular displacement between the coupling members 3 and 4 is required to initiate the release of air from the brake cylinders.

Should the vehicle be operating in the other direction from that described above, the magnetic drag effective between the members 6 and 7 before application of the brakes will cause the shaft 8 and lever 11 to be operated in a counterclockwise direction as viewed in Fig. 3, causing engagement of contact members 25 and 26 of the switch 14 with the contact members 32 and 33, respectively, so that the switch 45, which formerly controlled the application valve mechanism 65, will now control the release valve mechanism 66, and the switch 46 which formerly controlled the release valve mechanism 66 will now control the application valve mechanism 65.

It will be noted that if, at very high vehicle speeds, the coefficient of friction of the brake shoes is too low to give the vehicle a rate of retardation corresponding to that of the flywheel 10, the maximum braking effort available will be effective until a speed of the vehicle is reached at which it is being retarded at the same rate as the flywheel, and that for lower vehicle speeds a substantially constant rate of retardation will be maintained.

While I have illustrated and described one embodiment of my invention, many changes within the spirit of my invention may occur to those skilled in the art and I do not wish to be limited otherwise than by the scope of the appended claims.

Having now described my invention, what I claim as new and desire to secure by Letters Patent, is:

1. The combination with a fluid pressure braking means for vehicles, of a pilot brake for controlling the fluid pressure braking means comprising a flywheel driven in accordance with the speed of said vehicle and braking means for dissipating the stored energy in the flywheel at any chosen rate, and means for controlling the braking force applied to the vehicle in accordance with the rate of change in the stored energy of said flywheel.

2. The combination with a fluid pressure braking means for vehicles, of a pilot brake comprising a flywheel normally driven in accordance with the speed of the vehicle and braking means for retarding the speed of the flywheel, and means effective upon the application of a braking force to the flywheel for controlling the amount of braking force applied to the vehicle to decrease the kinetic energy stored in the vehicle at a rate corresponding to the decrease in kinetic energy stored in the flywheel.

3. The combination with a fluid pressure braking means for vehicles, of a pilot brake comprising a flywheel normally driven in accordance with the speed of the vehicle, an electro-dynamic brake for retarding the speed of the flywheel, and electrically controlled means effective upon the application of said electro-dynamic brake for controlling the amount of braking force applied to the vehicle to decrease the kinetic energy stored in the vehicle at a rate corresponding to the decrease in the kinetic energy stored in the flywheel.

4. In a brake equipment for vehicles, in combination, fluid pressure braking means, means for controlling said brake comprising an inertia device the stored kinetic energy of which is caused to vary substantially with variations in the kinetic energy stored in the vehicle and means for applying a selected retarding force to said inertia device, an application valve and a release valve for controlling the operation of said brake, and means responsive to the direction of energy transfer between said vehicle and said inertia device for controlling said valves.

5. In a brake equipment for vehicles, in combination, braking means, means for controlling said braking means comprising an inertia device the stored energy of which is caused to vary substantially with the variations in the kinetic energy stored in the vehicle, means for applying a retarding force to said inertia device, and means effective upon application of said retarding force and responsive to the direction of energy transfer between the vehicle and said inertia device for controlling said brake.

6. In a brake equipment for vehicles, in combination, a fluid pressure braking means, means for controlling said brake comprising a flywheel, means for driving said flywheel in accordance with the speed of said vehicle, means for applying a retarding force to said flywheel, and means effective upon the application of said retarding force and responsive to the tendency for the speed of said flywheel to vary from the speed of the vehicle for controlling said braking means.

7. The combination with a fluid pressure braking means for vehicles, of a pilot brake for controlling the fluid pressure brake comprising a flywheel, means including a loose coupling for driving the flywheel substantially in accordance with the speed of the wheels of said vehicle, an eddy current brake for dissipating the energy stored in said flywheel, and means for controlling the braking force applied to the vehicle in accordance with take-up on said coupling.

8. The combination with a fluid pressure braking means for vehicles, of a pilot brake for controlling the fluid pressure brake comprising a flywheel, means including a loose coupling for driving the flywheel substantially in accordance with the speed of the wheels of said vehicle, an eddy current brake for dissipating the energy stored in said flywheel, and means for applying and releasing said fluid pressure braking means in accordance with the direction of the take-up on said coupling.

9. The combination with a fluid pressure braking means for vehicles, of a pilot brake for controlling the fluid pressure brake comprising a flywheel, means including a loose coupling for driving the flywheel in accordance with the speed of the wheels of said vehicle, an eddy current brake for dissipating the energy stored in said flywheel, and means effective upon the energization of said eddy current brake for controlling the application and release of said fluid pressure braking means in accordance with the direction and duration of torque existing on said coupling.

10. The combination with a fluid pressure braking means for vehicles, of a pilot brake for controlling the fluid pressure braking means comprising a flywheel driven in accordance with the speed of said vehicle and braking means for dissipating the stored energy of the flywheel, a brake handle for controlling the pilot brake, means for controlling the braking force applied to the vehicle in accordance with the rate of change in the stored energy of said flywheel, and means responsive to the amount of movement of the brake handle from a given position for controlling the degree of application of said pilot brake.

11. The combination with a fluid pressure braking means for vehicles, of a pilot brake comprising a flywheel normally driven in accordance with the speed of the vehicle and braking means for retarding the speed of the flywheel, means effective upon the application of a braking force to the flywheel for controlling the amount of braking force applied to the vehicle to decrease the kinetic energy stored in the vehicle at a rate corresponding to the decrease in kinetic energy stored in the flywheel, a brake controlling handle, and means responsive to the amount of movement of the brake handle from a given position for controlling the degree of application of said pilot brake.

12. The combination with a fluid pressure braking means for vehicles, of a pilot brake comprising a flywheel normally driven in accordance with the speed of the vehicle, an electro-dynamic brake for retarding the speed of the flywheel, an electrically controlled means effective upon the application of said electro-dynamic brake for controlling the amount of braking force applied to the vehicle to decrease the kinetic energy stored in the vehicle at a rate corresponding to the decrease in the kinetic energy stored in the flywheel, a brake controlling handle, and means responsive to the amount of movement of the brake handle from a given position for controlling the degree of application of the pilot brake.

13. In a brake equipment for vehicles, in combination, fluid pressure braking means, means for controlling said braking means comprising an inertia device the stored kinetic energy of which is caused to vary substantially with variation in the kinetic energy stored in the vehicle, a brake controlling handle, and means responsive to the amount of movement of the brake controlling handle from a given position for controlling the degree of application of a retarding force to said inertia device, an application valve and a release valve for controlling the operation of said fluid pressure braking means, and means responsive to the direction of energy transfer between said vehicle and said inertia device for controlling said valves.

14. In a brake equipment for vehicles, in combination, a fluid pressure braking means, means for controlling said braking means comprising a flywheel, means for driving said flywheel in accordance with the speed of said vehicle, a brake controlling handle and means for applying a retarding force to said flywheel that varies in accordance with the amount of movement of said brake controlling handle from a given position, and means effective upon the application of said retarding force and responsive to the tendency for the speed of said flywheel to vary from the speed of the vehicle for controlling said fluid pressure braking means.

15. The combination with a fluid pressure braking means for vehicles, of a pilot brake for controlling the fluid pressure brake comprising a flywheel, means including a loose coupling for driving the flywheel in accordance with the speed of the wheels of said vehicle, an eddy current brake for dissipating the energy stored in said flywheel, means effective upon the energization of said eddy current brake for controlling the application and release of said fluid pressure braking means in accordance with the direction and duration of torque existing on said coupling, a brake controlling handle, and means for energizing said eddy current brake to a degree depending upon the amount of movement of said brake controlling handle from a given position.

16. In a vehicle brake system, in combination, brake means for braking the vehicle, a pilot brake device, means for controlling the pilot brake device according to a desired degree of braking, and means for controlling said brake means to produce a braking characteristic corresponding to the braking characteristic of said pilot brake device.

17. In a vehicle brake system, in combination, a brake cylinder, a pilot brake device, means for controlling said pilot brake device to produce a desired degree of braking, and means for controlling the supply of fluid under pressure to and its release from said brake cylinder to produce a braking effect on the vehicle corresponding to the braking characteristic of said pilot brake device.

18. In a vehicle brake system, in combination, a brake cylinder, an eddy current brake device, a rotatable member rotated according to the speed of the vehicle, a second rotatable member associated with said eddy current brake device, means for driving said second rotatable member by said first rotatable member and providing for a limited degree of relative rotational movement therebetween, and means operated according to relative movement between said members for controlling the supply of fluid under pressure to and its release from said brake cylinder to produce a braking effect on the vehicle according to the braking characteristic of said eddy current brake device.

19. In a vehicle brake system, in combination, two rotatable members, an electrodynamic brake device for producing a braking effect on one of said members, a fluid pressure brake device for producing a braking effect on the other of said members, means for controlling operation of said eddy current brake device, and means for controlling said fluid pressure brake device to produce a braking effect on said second rotatable member corresponding to the braking effect produced on said first rotatable member.

GEORGE W. BAUGHMAN.